(12) United States Patent
Bianco

(10) Patent No.: US 6,345,359 B1
(45) Date of Patent: Feb. 5, 2002

(54) IN-LINE DECRYPTION FOR PROTECTING EMBEDDED SOFTWARE

(75) Inventor: Mark E. Bianco, Pomona, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/970,604

(22) Filed: Nov. 14, 1997

(51) Int. Cl.$^7$ ................................................ G06F 11/30
(52) U.S. Cl. ...................................................... 713/190
(58) Field of Search ............................ 380/4; 713/165, 713/194, 190, 162

(56) References Cited

U.S. PATENT DOCUMENTS

| | | | | |
|---|---|---|---|---|
| 3,706,941 A | * | 12/1972 | Cohn | 331/78 |
| 4,168,396 A | * | 9/1979 | Best | 380/4 |
| 4,306,289 A | * | 12/1981 | Lumley | 380/4 |
| 4,562,305 A | * | 12/1985 | Gaffney, Jr. | 380/4 |
| 4,634,807 A | * | 1/1987 | Chorley et al. | |
| 4,780,905 A | * | 10/1988 | Cruts et al. | |
| 4,823,308 A | * | 4/1989 | Knight | |
| 4,847,902 A | * | 7/1989 | Hampson | 380/4 |
| 5,058,164 A | * | 10/1991 | Elmer et al. | |
| 5,182,770 A | * | 1/1993 | Medveczky et al. | 380/4 |
| 5,224,166 A | * | 6/1993 | Elmer et al. | |
| 5,557,503 A | * | 9/1996 | Isaacs et al. | 361/719 |
| 5,671,275 A | * | 9/1997 | Ezuriko | 380/4 |
| 5,812,662 A | * | 9/1998 | Hsu et al. | |
| 5,892,826 A | * | 4/1999 | Brown et al. | 380/4 |

OTHER PUBLICATIONS

Bruce Schneier, Aplied Cryptography, p. 398–399, 423, 1996.*
Horst Feistel, Cryptography and Computer Privacy, Scientific American, 228(5), 15–23, May 1973.*
Bruce Schneier, Applied Cryptography, 2e, 423, 294–300, 1996.*
Richard Voss and John Clarke 1/f noise in Music: Music from 1/f Noise, J. Acoust. Soc. Am. 63(1), Jan. 1978.*
Schniere, Applied Cryptology, John Wiley, pp. 2–3, 11–12, 210–211, 265–301, 423, Oct. 1995.*
Menezes, et. al., Handbook of Applied Cryptography, CRC Press, 1996.*

* cited by examiner

*Primary Examiner*—Gail Hayes
*Assistant Examiner*—James Seal
(74) *Attorney, Agent, or Firm*—Leonard A. Alkov; Glenn H. Lenzen, Jr.

(57) ABSTRACT

An in-line decryptor is employed to decrypt software (program instructions) transferred from a read only memory to a central processing unit. The in-line decryptor comprises a keystream generator that contains a cryptographic algorithm coupled to a memory that stores cryptographic keys. A combining function implemented using two substitution functions and two XOR functions generates an output keystream of the keystream generator. The decryptor uses the cryptographic algorithm to initialize a variation of a one time pad cryptosystem. Using a number of relatively short pseudorandom sequences and a simple combining function, a much longer address-dependent pseudorandom sequence is created. This sequence is used to decrypt the encrypted software in real time on an instruction-by-instruction basis.

23 Claims, 2 Drawing Sheets

IN-LINE DECRYPTION FOR PROTECTING EMBEDDED SOFTWARE

BACKGROUND

The present invention relates generally to decryption apparatus, and more particularly, to in-line decryption apparatus that is used to protect embedded software.

The most common forms of software protection are copyrights and patents. While such protection is necessary if the option to prosecute alleged infringements in a court of law is desired, legal techniques do not prevent unauthorized access to software; they only act as a psychological deterrent. They are also difficult to enforce internationally.

The present invention uses technical protection mechanisms to actually deny a copyist or reverse-engineer access to the sensitive software. The effort required to defeat the present invention therefore represents a much more significant deterrent since technical obstacles must now be overcome.

The two most common forms of technical software protection are based on physical techniques and cryptographic techniques. One physical technique stores sensitive software in nonvolatile memory within a microprocessor (e.g., a ROM integrated directly in the microprocessor die) that can be programmed during manufacture but that cannot be easily read back out. The amount of on-chip ROM that can be provided limits the amount of software that can be protected.

Another physical technique stores sensitive software in volatile memory (e.g., a battery-backed RAM) external to the microprocessor but within a system enclosure that is erased when electronic tamper detection circuits detect attempted intrusion or disassembly of the enclosure. The disadvantages of this approach are accidental activation of tamper sensors, issues related to battery lifetime and reliability, complicated maintenance procedures, sensor reliability and false alarm resistance, and the difficulty of incorporating sensors and associated wiring into a host system such that they cannot be bypassed or defeated.

One method of cryptographic protection for software uses the memory address and cryptographically weak algorithms to unscramble data contained at that address prior to execution. Such techniques are not robust and can be easily defeated. Another method uses strong cryptographic algorithms to decrypt an entire segment of encrypted software during system initialization, which is then stored in a cache memory and executed normally. Again, the amount of cache memory that is provided limits the amount of software that can be protected, and the time required to initially decrypt the software may be unacceptable in some time-critical applications.

The increased performance and reduced costs of modem microprocessors allows sensitive system functions previously implemented in hardware to be implemented in software. Since complex software programs are easier to reverse-engineer than complex hardware devices, there is a rapidly growing need to protect the software embedded in critical or high-value systems. Such protection is desired to prevent the unauthorized modification and/or use of the software, to prevent the disclosure and/or transfer of the technology contained within the software program to unauthorized parties, to protect the significant investments represented by software-intensive systems and to enhance competitiveness.

Although cryptography has been used in the past to protect software during distribution and storage, such software has remained vulnerable in system memory after it had been decrypted and during actual execution. Previous attempts at decrypting software with strong algorithms on an instruction-by-instruction basis has been hampered by the unacceptable time delay required to decrypt each instruction and by the loss of crypto-synchronization that can occur when a program branches during execution. To avoid these obstacles, scrambling algorithms based on simple non-cryptographic techniques have been used that do not increase execution time and that are not susceptible to loss of synchronization. However, they are easy to defeat and therefore not capable of providing the levels of protection desired for high-value software and software used in sensitive applications.

Accordingly, it is an objective of the present invention to provide for in-line decryption apparatus that is used to protect embedded software.

SUMMARY OF THE INVENTION

To accomplish the above and other objectives, the present invention provides for an in-line decryptor that is used to protect software embedded in a system. Unauthorized access to software embedded in the system is prevented by way of in-line decryption of the encrypted software. Using a combination of cryptographic techniques, encrypted software can be safely stored within the system in nonvolatile memory or magnetic media, or retrieved via network access, without risk of modification, replacement, disassembly, or understanding by unauthorized parties. In addition, although copies can be made, they are useless without the present decryptor.

The present invention overcomes the limitations of conventional approaches since decryption occurs on an instruction-by-instruction basis, thus avoiding the physical limitations of ROM and cache capacity and the need for complex tamper detection functions. The present invention also allows the use of conventional cryptographic algorithms while avoiding the loss of crypto-synchronization problems that typically occur with previous cryptographic solutions when a program branches during execution.

A preferred embodiment of the decryptor uses a conventional cryptographic algorithm to initialize a variation of a one time pad cryptosystem. Using a number of relatively short pseudorandom sequences and a simple combining function, a much longer address-dependent pseudorandom sequence is created. This sequence is then used to decrypt the encrypted software in real time on an instruction-by-instruction basis.

In a second embodiment, random sequences are generated using a random physical process and stored permanently in nonvolatile memory. The cryptographic algorithm in the preferred embodiment is not used. The second embodiment is not as secure as the preferred embodiment, but it is simpler to implement and provides a better level of security than the techniques used in the past.

In either embodiment, the encrypted software is not vulnerable to traditional forms of cryptanalysis since a copyist or reverse-engineer is denied physical and electronic access to the decryption function and its outputs.

The present invention overcomes the limitations of conventional systems while allowing the use of existing cryptographic algorithms with proven strength. It can protect sensitive software during distribution, storage, and use. Furthermore, the execution time of instructions is not affected, program branches are handled with ease, and complex physical protection techniques are not necessary.

The present invention may be used with any system that implements sensitive functions in embedded software, such as software embedded in cellular telephones, computer and network products, and air traffic control systems, for example.

The present invention may also be with technologically advanced software-intensive systems that require off-shore maintenance since off-shore access to the software in its encrypted form will not place that software at risk.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
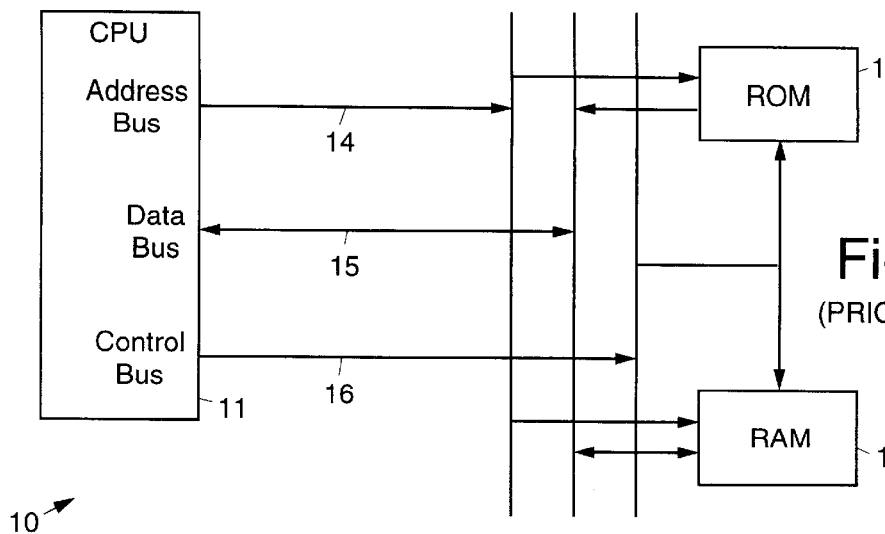
FIG. 1 illustrates a conventional CPU-based system.

Referring to the drawing figures, a typical conventional CPU-based system 10 is shown in FIG. 1. A central processing unit (CPU) 11 is coupled to a read only memory (ROM) 12 and to a random access memory (RAM) 13 in a conventional manner. The central processing unit (CPU) 11 has a conventional unidirectional address bus 14, bidirectional data bus 15, and a control bus 16 that are coupled to the ROM 12 and RAM 13. The CPU 11 transfers a number of control signals over the control bus 16 such as Read Enable, Write Enable, ROM Enable, and RAM Enable. Other devices such as input/output drivers, memory management units, and network interfaces (not shown) may also be connected to these busses 14–16. Program instructions are transferred between the ROM 12, RAM 12 and the CPU 11 by way of the busses 14–16.

Figure 2:
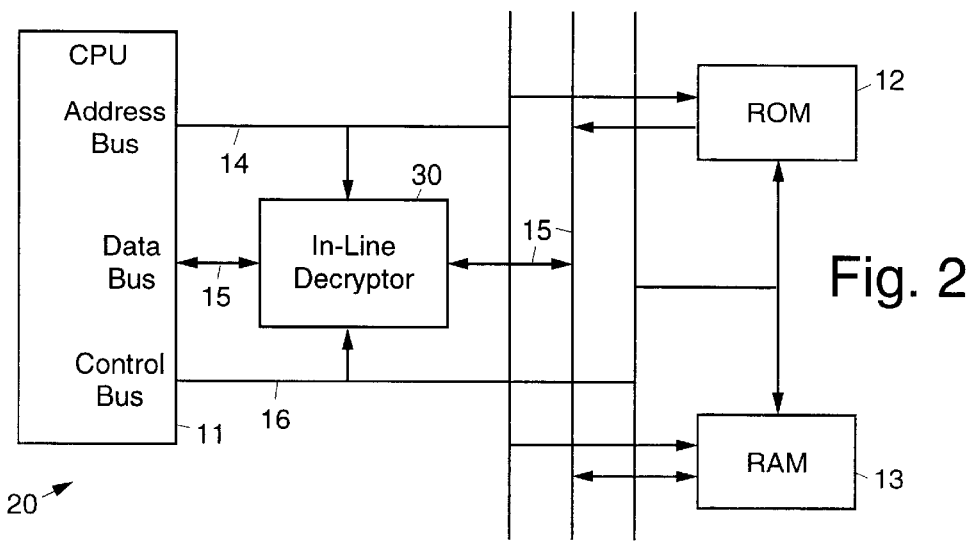
FIG. 2 illustrates a CPU-based system employing an in-line decryptor in accordance with the principles of the present invention.

Referring now to FIG. 2, it illustrates a CPU-based system 20 employing an in-line decryptor 30 in accordance with the principles of the present invention. Since the present invention decrypts each program instruction just prior to its execution, the in-line decryptor 30 is inserted in-line with the data bus 15 as is shown in FIG. 2.

Any CPU 11 or microprocessor may be used with the in-line decryptor 30, and the present invention does not limit or restrict the selection of CPU 11. The present invention is also compatible with CPUs 11 that use internal or external cache memory (not shown) for improved execution performance.

Figure 3:
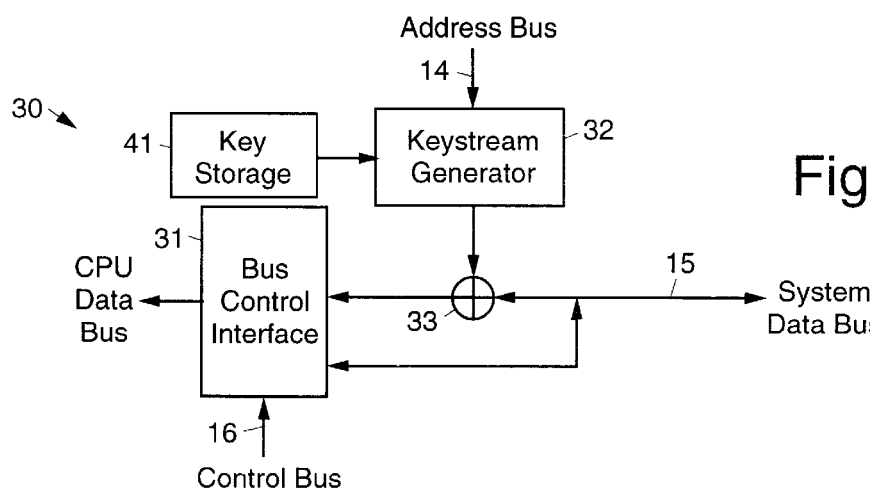
FIG. 3 is a block diagram of the in-line decryptor in accordance with the present invention.

A block diagram of the in-line decryptor 30 is shown in FIG. 3. The in-line decryptor 30 comprises a bus control interface 31, a keystream generator 32 and a summing device 33 that is disposed in-line with the system data bus 15 prior to the bus control interface 31. The address bus 14 provides an input to the keystream generator 32 while the control bus 16 is coupled to the bus control interface in a conventional manner. The in-line decryptor 30 operates in three different modes: ROM read, RAM write, and RAM read.

When the CPU 11 attempts to read program instructions from the ROM 12, the address bus 14 and control signals operate as usual. The in-line decryptor 30 uses the address of each instruction as an input to the keystream generator 32, which implements a cryptographic process that produces a pseudorandom word of the same width as the data bus 15. The pseudorandom word is then bitwise exclusive-or'd (XOR'd) with the encrypted instruction from the ROM 12 via the system data bus 15 to decrypt the instruction, which is then output to the CPU data bus for execution. Since the decryption process associated with each word from the ROM 12 is a function of its address, crypto-synchronization is maintained even as program execution jumps between different sections of the ROM 12. In addition, program execution is not delayed since decryption occurs within a single clock period (assuming that the in-line decryptor 20 is implemented using devices whose propagation delays provide sufficient timing margins for the clock rates that are used).

When the CPU 11 attempts to write data to the RAM 13, the bus control interface 31 in the in-line decryptor 30 decodes the control signals and allows data from the CPU data bus to pass through the in-line decryptor 30 to the system data bus 15 without modification.

When the CPU 11 attempts to read data from the RAM 12, the bus control interface 31 decodes the control signals and allows the data on the system data bus 15 to pass through the in-line decryptor 30 to the CPU data bus without modification.

Some CPUs 11 use cache memory for improved execution performance. The in-line decryptor 30 is compatible with these architectures since the software is decrypted as it is read from the ROM 12 via the system data bus 15. The decrypted software can then be executed from cache memory as usual.

Although the description so far has focused on ROM-based storage of encrypted software, the present invention may also be used to protect software stored in magnetic media or obtained via network access. However, since the present invention relies on the physical address of each instruction for proper decryption, the physical memory locations in which this software is loaded must be carefully controlled.

Figure 4:
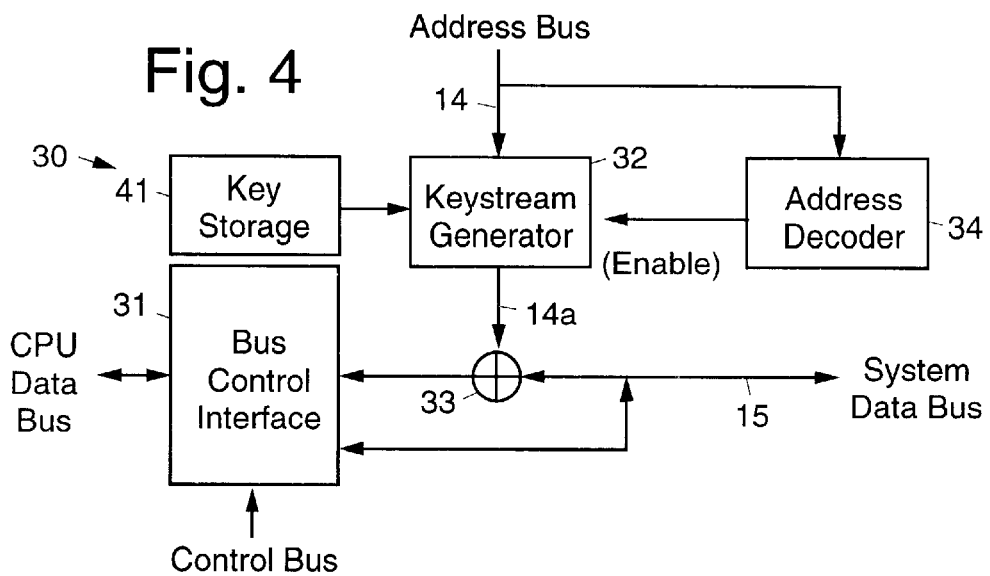
FIG. 4 shows an in-line decryptor in accordance with the present invention that supports execution of non-encrypted instructions.

In some instances, it may be desirable to allow the execution of non-encrypted program instructions from the ROM 12. In this case, an address decoder 34 may be included in the in-line decryptor 30 as is shown in FIG. 4. When the CPU 11 attempts to read program instructions from the addresses or address segments allocated to non-encrypted instructions, the address decoder 34 disables the output of the keystream generator 32. Those instructions will then pass through the in-line decryptor 30 to the CPU data bus 15 without modification.

To maintain the cryptographic strength of the in-line decryptor 30, physical and electronic access to the output of the in-line decryptor 30 (i.e., the CPU data bus 15) must be prevented. This may be accomplished by monolithically integrating the CPU 11 and in-line decryptor 30 on a single die (which is the most robust approach), or by integrating the CPU 11 and an in-line decryptor 30 in a multi-chip module (which is not as robust but may be acceptable is less critical applications), or by using conventional packaged devices encased in a tamper-resistant opaque potting material (which is the least robust of the three approaches). The security of the first two approaches may be further enhanced by protecting the surface of the CPU die or multi-chip module cavity with a suitable tamper-resistant opaque material.

Figure 5:
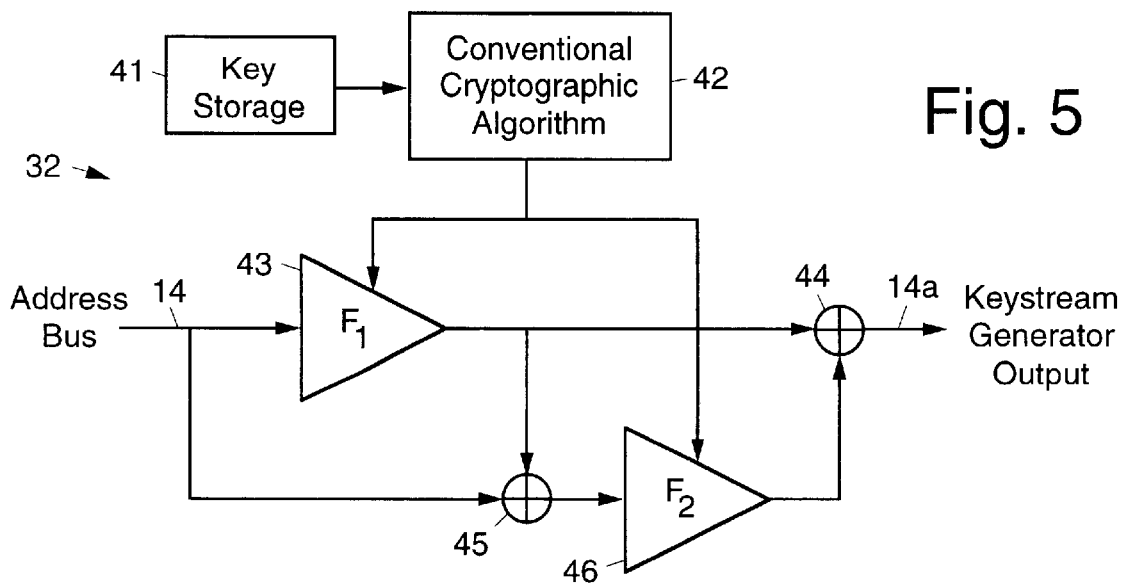
FIG. 5 is a block diagram of a keystream generator used in the present invention.

A detailed description of the in-line decryptor 30 is presented below. The keystream generator 32 is the cryptographic core of the in-line decryptor 30, and implements a conventional cryptographic algorithm 42, a small memory 41 to store cryptographic keys, two substitution functions 43, 46 ($F_1$ and $F_2$), and two XOR functions 44, 45 as shown in FIG. 5. The in-line decryptor 30 does not limit the selection or performance of the cryptographic algorithm 42, nor the capacity or width of the substitution functions 43, 46. Key storage 41 may be implemented in either volatile or nonvolatile memory, depending on the particular application. The XOR functions 44, 45 are the same width as the output of the substitution functions 43, 46, and perform the bitwise XOR of two n-bit inputs to produce an n-bit output. Each substitution function 43, 46 contains pseudorandom data generated by the cryptographic algorithm 42 as part of the initialization process of the in-line decryptor 30. For maximum cryptographic strength, each substitution function 43, 46 should be statistically unbiased, each should be nonlinear, and the two functions 43, 46 should interact with the XOR functions 44, 45 (combining function) in such a manner as to ensure that the output of the keystream generator 32 is also statistically unbiased and nonlinear. The substitution functions 43, 46 are preferably implemented as substitution tables using RAM devices, although other forms of implementation are possible and equally effective.

The substitution functions 43, 46 and XOR functions 44, 45 implement a form of cryptography known as a one time pad. However, conventional one time pads are the same length as the message that is protected. Such an implementation would therefore not be an efficient method to protect embedded software, since the storage capacity required to store the pad would be equal to the length of the software that is protected, offering no advantage over storing the software directly in a ROM embedded within the CPU 11. The in-line decryptor 30 therefore uses two substitution functions 43, 46 and a combining function (XOR functions 44, 45) to produce a much longer sequence from the two shorter sequences. For example, if the keystream generator shown in FIG. 5 is implemented with two 1024×8 RAM devices, it can protect up to 1,048,576 bytes of program instructions. For 16-bit or 32-bit data busses 15, additional RAM devices can be used in parallel to extend the word size. Similarly, higher capacity RAM devices can be used to protect software that requires more than 1 Mbyte of storage. Since the combining function uses simple combinatorial logic and since the access times of RAM devices are faster than ROM devices, decryption is accomplished within a single clock cycle and therefore does not increase the execution time of the instruction. Access time is increased, but selection of components with adequate propagation delays ensure that timing margins are maintained.

Since the substitution functions 43, 46 are driven by the address of the instruction to be decrypted, and since they are shorter than the software program that is protected, the address bus 14 must be split between the two substitution functions 43, 46. For example, assume that the substitution functions 43, 46 are implemented as two 1024×8 RAM devices. Each RAM device therefore has 10 address bits. Assuming that the CPU address bus 15 is 20 bits wide (or that the software program that is protected requires less than 1 Mbyte of storage), then the CPU address bus 14 can be split evenly between the two substitution functions 43, 46. Any combination of address bits can be used, although cryptographic strength is maximized if the input to each substitution function 43, 46 contains an even distribution of higher-order and lower-order address bits and if each address bit is used exactly once. For example, $F_1$ and $F_2$ might be driven by address bits (19, 17, 15, 13, 11, 9, 7, 5, 3, 1) and (18, 16, 14, 12, 10, 8, 6, 4, 2, 0), or by (17, 16, 11, 10, 9, 8, 3, 2, 1, 0) and (19, 18, 15, 14, 13, 12, 7, 6, 5, 4).

Any conventional cryptographic algorithm 42 can be used in the keystream generator 32. To minimize the time required to initialize the substitution functions 43, 46, a symmetric algorithm such as the Data Encryption Standard (DES) is preferred. An asymmetric algorithm 42 such as Rivest-Shamir-Adleman (RSA) may also be used, but the initialization time will increase, and the implementation is more complex due to its mathematical processing requirements. Using the example implementation described above, 2,048 bytes must be generated in order to protect 1,048,576 bytes of software. Using DES, this requires only 256 iterations of the algorithm 42.

To initially encrypt the software, a similar process can be implemented either in hardware or software. Since the encryption and decryption processes are identical, the in-line decryptor 30 can be used to encrypt as well as decrypt. For example, a test fixture may be built using the in-line decryptor 30 and a computer interface. The computer would load the address and the word to be encrypted, the in-line decryptor 30 would encrypt it, and the computer would read the encrypted word back. Alternatively, the function of the keystream generator 32 may be implemented completely in a software encryption tool, allowing the entire encryption process to take place without the need for any specialized hardware.

To maximize cryptographic security, a unique cryptographic key should be used with each software application, and with each version update. Since the keys are very short compared to the sequence they produce (approximately 128 bits each for most commercially available algorithms 42), many keys can be stored in the in-line decryptor 30 in a small amount of memory.

A variation of the in-line decryptor 30 implements the substitution functions 43, 46 with nonvolatile memory devices (e.g., ROM, PROM, EEPROM, or UV-EPROM). The ROM devices are programmed during manufacture of the in-line decryptor 30 with statistically unbiased random data generated by a nondeterministic process (e.g., thermal or atmospheric noise. The in-line decryptor 30 then operates as previously described. The cryptographic algorithm 42 and key storage 41 required by the preferred embodiment are not needed.

The advantage of this variation of the in-line decryptor 30 is that the time required to initialize the substitution functions 43, 46 in the preferred embodiment is eliminated. This approach may therefore be more suitable in certain time-critical applications. However, it also has a number of disadvantages, including larger die sizes (since ROM is physically larger than RAM), less flexibility to protect multiple software programs with a single in-line decryptor 30 (since extra ROM capacity is required), and it is less secure (since the contents of the ROM can be more easily extracted by a skilled reverse-engineer when compared with RAM). It is also slower since access times for the ROM are greater than for RAM, although the contents of the ROM can be transferred to RAM during initialization to minimize this disadvantage. This embodiment nonetheless provides better security than the techniques used in the past.

Since access to the output of the keystream generator 32 will reveal both the keystream used to encrypt the software and the decrypted software itself, such access must be prevented. Monolithically integrating the in-line decryptor 30 with the CPU 11 is the most robust technique. Use of a tamper-resistant material on the die also significantly enhances the overall level of security since removal typically causes damage to the die surface. If the damage is sufficient to prevent normal operation of the CPU 11, then successfully recovering the keystream or decrypted software will be made very difficult.

A strong cryptographic algorithm 42 should be used in the keystream generator 32. Since access to the output of the keystream generator 32 must be prevented for the reasons previously described, many forms of cryptanalysis become difficult or impossible to apply. Exhaustive attacks remain feasible, however, so an algorithm 42 with a sufficiently long key should be used. For most applications, DES or Triple-DES satisfies these requirements.

Although the invention is capable of encryption as well as decryption, the in-line decryptor 30 should generally not be used to encrypt temporary data stored in system memory (e.g., RAM, magnetic media, etc.). This could seriously undermine the security provided to the software program that is protected.

Thus, in-line decryption apparatus that protects embedded software has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Apparatus for protecting embedded software, said apparatus comprising:
   a central processing unit having a unidirectional address bus, bidirectional data bus, and a control bus;
   a read only memory coupled to the central processing unit by way of the busses;
   and wherein individual encrypted program instructions are transferred between the read only memory and the central processing unit by way of the busses; and
   a key-dependent in-line decryptor disposed in-line with the data bus for decrypting the individual encrypted program instructions that are transferred from the read only memory to the central processing unit on an instruction-by-instruction basis, which decrypted program instructions are executed by the central processing unit without interim storage.

2. The apparatus of claim 1 wherein the in-line decryptor comprises:
   a bus control interface having an input coupled to the control bus;
   a keystream generator having an input coupled to the address bus; and
   a summing device that is disposed in-line with the data bus prior to the bus control interface of the central processing unit.

3. The apparatus of claim 1 wherein the in-line decryptor operates in a read only memory read mode, wherein when the central processing unit reads program instructions from the read only memory, the in-line decryptor uses the address of each instruction as an input to the keystream generator, which implements a cryptographic process that produces a pseudorandom word of the same width as the data bus, and wherein the pseudorandom word is then bitwise exclusive-or'd with the encrypted instruction from the read only memory via the data bus to decrypt the instruction, which is then output to the central processing unit data bus for execution.

4. The apparatus of claim 1 further comprising an address decoder coupled to the address bus and the keystream generator for disabling the output of the keystream generator when the central processing unit attempts to read program instructions from addresses or address segments allocated to non-encrypted instructions, which instructions pass through the in-line decryptor to the central processing unit data bus without modification.

5. The apparatus of claim 1 wherein the central processing unit and in-line decryptor are monolithically integrated on a single die.

6. The apparatus of claim 1 wherein the central processing unit and in-line decryptor are integrated in a single multi-chip module.

7. The apparatus of claim 1 wherein the central processing unit and in-line decryptor are encased in a tamper-resistant material.

8. The apparatus of claim 1 further comprising:
   a random access memory coupled to the central processing unit by way of the busses.

9. The apparatus of claim 8 wherein the in-line decryptor operates in a random access memory write mode, wherein when the central processing unit attempts to write data to the random access memory, the bus control interface in the in-line decryptor decodes control signals to allow data from the central processing unit data bus to pass through the in-line decryptor to the data bus without modification.

10. The apparatus of claim 8 wherein the in-line decryptor operates in a random access memory read mode, wherein when the central processing unit attempts to read data from the random access memory, the bus control interface decodes control signals to allow the data on system data bus to pass through the in-line decryptor to the central processing unit data bus without modification.

11. The apparatus of claim 1 wherein the in-line decryptor comprises:
   a keystream generator;
   a memory for storing cryptographic keys;
   first and second substitution functions that contain pseudorandom data generated by a cryptographic algorithm; and
   first and second XOR functions that respectively perform a bitwise XOR of two n-bit inputs to produce an n-bit output.

12. The apparatus of claim 11 wherein each substitution function is statistically unbiased and nonlinear, and the functions interact with the XOR functions in such a manner as to ensure that the output of the keystream generator is also statistically unbiased and nonlinear.

13. The apparatus of claim 12 wherein the substitution functions are implemented as substitution tables using RAM devices.

14. The apparatus of claim 11 wherein the cryptographic algorithm comprises a symmetric cryptographic algorithm.

15. The apparatus of claim 14 wherein the symmetric cryptographic algorithm comprises a Data Encryption Standard algorithm.

16. The apparatus of claim 11 wherein the cryptographic algorithm comprises an asymmetric cryptographic algorithm.

17. The apparatus of claim 16 wherein the asymmetric cryptographic algorithm comprises a Rivest-Shamir-Adleman algorithm.

18. The apparatus of claim 11 wherein the substitution functions are implemented using nonvolatile memory devices that are programmed with statistically unbiased random data generated by a nondeterministic process.

19. The apparatus of claim 18 wherein the nonvolatile memory devices are selected from the group comprising read only memories, programmable read only memories, electrically eraseable programmable read only memories, and ultraviolet radiation programmable read only memories.

20. The apparatus of claim 18 wherein the nonvolatile memory devices are programmed using thermal noise.

21. The apparatus of claim 18 wherein the nonvolatile memory devices are programmed using atmospheric noise.

22. Apparatus for protecting embedded software, said apparatus comprising:

a central processing unit having a unidirectional address bus, bidirectional data bus, and a control bus;

a storage device coupled to the central processing unit by way of the busses;

and wherein encrypted program instructions are transferred between the storage device and the central processing unit by way of the busses; and an in-line decryptor disposed in-line with the data bus for decrypting the individual encrypted program instructions that are transferred from the storage device to the central processing unit on an instruction-by-instruction basis, which decrypted program instructions are executed by the central processing unit without interim storage.

23. The apparatus of claim 22 wherein the in-line decryptor comprises:

a keystream generator;

a memory for storing cryptographic keys;

first and second substitution functions that contain pseudorandom data generated by the cryptographic algorithm; and first and second XOR functions that respectively perform a bitwise XOR of two n-bit inputs to produce an n-bit output.

* * * * *